United States Patent

Sands

[11] Patent Number: 5,889,837
[45] Date of Patent: Mar. 30, 1999

[54] TESTING A SUBSCRIBER TERMINAL OF A WIRELESS TELECOMMUNICATIONS SYSTEM

[75] Inventor: Joseph Sands, Blackheath, United Kingdom

[73] Assignee: AirSpan Communications Corporation, Feltham, Great Britain

[21] Appl. No.: 658,939

[22] Filed: May 31, 1996

[30] Foreign Application Priority Data

Feb. 21, 1996 [GB] United Kingdom .................... 9603693

[51] Int. Cl.⁶ .............................. H04M 1/24; H04M 3/08; H04M 3/22
[52] U.S. Cl. ................................. 379/27; 379/26; 379/30; 379/34; 455/425
[58] Field of Search ..................................... 379/2, 27, 29, 379/32, 34, 58, 59, 60, 63, 1, 5, 22, 23, 26, 30; 455/67.1, 423, 425

[56] References Cited

U.S. PATENT DOCUMENTS

| | | | |
|---|---|---|---|
| 4,197,435 | 4/1980 | Jackson et al. | 179/175.3 R |
| 4,558,182 | 12/1985 | Perry et al. | 179/81 R |
| 4,658,096 | 4/1987 | West, Jr. et al. | 379/59 |
| 4,686,696 | 8/1987 | Lynch | 379/22 |
| 4,737,975 | 4/1988 | Shafer | 379/58 |
| 5,056,131 | 10/1991 | Kanare et al. | 379/33 |
| 5,218,616 | 6/1993 | Stephens | 379/27 |
| 5,408,525 | 4/1995 | Eldering | 379/165 |
| 5,469,494 | 11/1995 | Perez et al. | 379/34 |
| 5,475,735 | 12/1995 | Williams et al. | 379/59 |
| 5,768,365 | 6/1998 | Kurdziel | 379/27 |

FOREIGN PATENT DOCUMENTS

| | | | |
|---|---|---|---|
| 0643519 | 3/1995 | European Pat. Off. . | |
| 3304438 | 8/1984 | Germany | H04Q 1/20 |
| 2223379 | 4/1990 | United Kingdom | H04M 1/24 |
| 9419877 | 9/1994 | WIPO | H04B 7/204 |
| 9519686 | 7/1995 | WIPO . | |
| 9602103 | 1/1996 | WIPO | H04M 1/00 |

Primary Examiner—Curtis A. Kuntz
Assistant Examiner—Binh K. Tieu
Attorney, Agent, or Firm—Baker & Botts, L.L.P.

[57] ABSTRACT

A subscriber station provides the wireless connection of user telecommunications equipment to a remote central station of a wireless telecommunications system. The subscriber station includes a transmitter/receiver for wireless communication with a central station and for processing signals for transmission and/or received signals, at least one telephone line for connection to subscriber telecommunications equipment, and a high impedance test circuit connected across a telephone line under test. The use of a high impedance test circuit means that the test circuit can effectively be connected permanently across a telephone line under test. By effectively connecting the high impedance test circuit permanently across the telephone line under test, that is connecting the test circuit across the telephone line during all operational conditions of the telephone line, the test circuit is able to provide a range of test functions, including self-test functions in a cost effective manner, which would not be possible with the conventional test circuits which are only switched in during line testing.

20 Claims, 13 Drawing Sheets

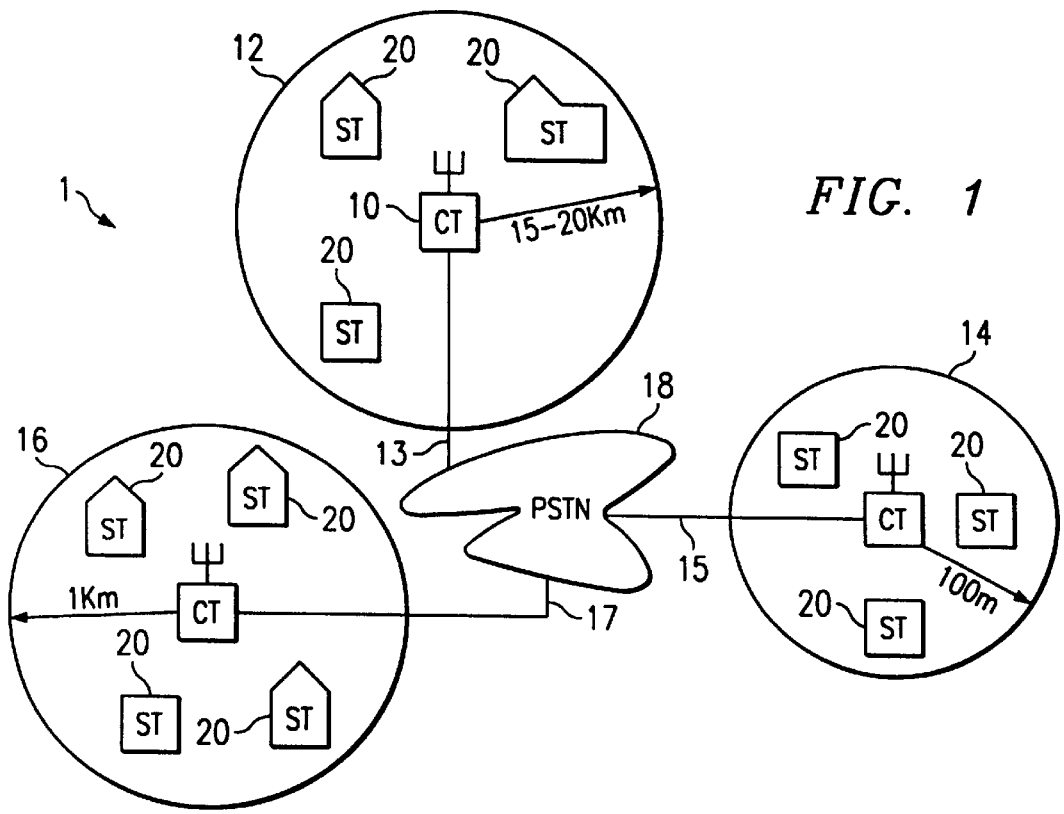
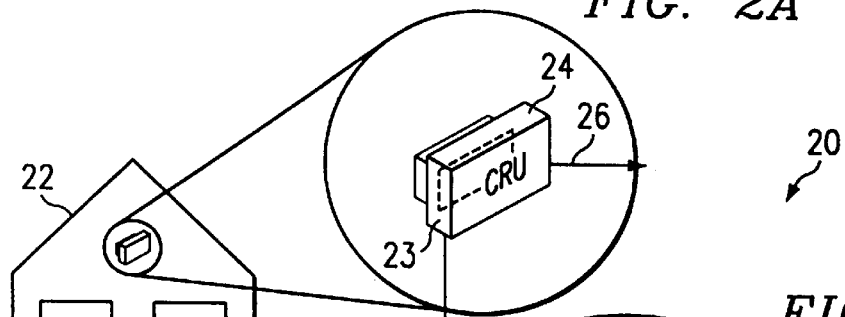
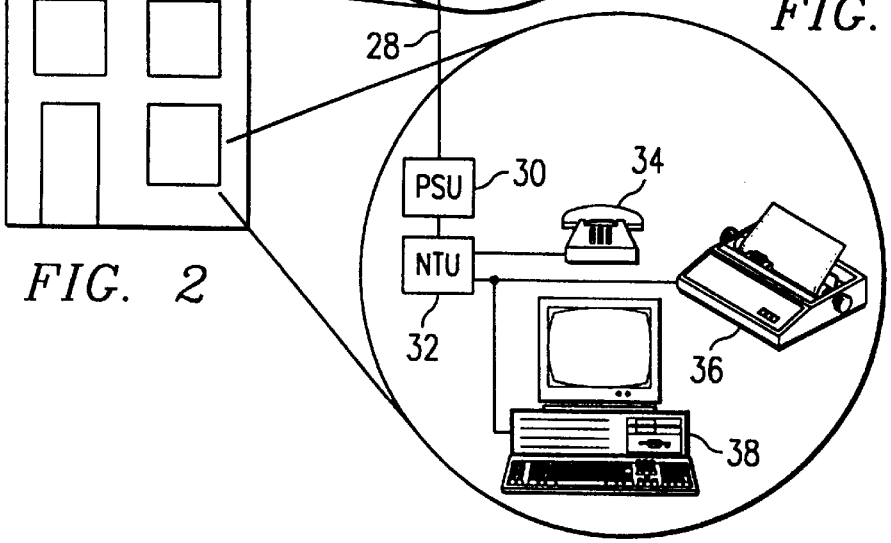

TESTING A SUBSCRIBER TERMINAL OF A WIRELESS TELECOMMUNICATIONS SYSTEM

CROSS-REFERENCE TO RELATED APPLICATION

This application claims the benefit of United Kingdom Application No. 9603693.4 filed Feb. 21, 1996.

TECHNICAL FIELD OF THE INVENTION

The present invention relates in general to telecommunications systems and more particularly to testing a subscriber terminal of a wireless telecommunications system.

BACKGROUND OF THE INVENTION

A wireless telecommunications system has been proposed with a central terminal, or station, at a central location in wireless communication with a plurality of subscriber terminals, or stations, at subscriber locations to implement a wireless telephony system. The system is intended to be used with fixed subscriber locations rather than the more familiar mobile cellular telephone systems.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

In the proposed system, the subscriber terminal is required to perform wireless transmission and reception tasks, signal coding and decoding tasks, initialisation and authentication tasks as well conventional telephony tasks. It will be appreciated that in order to ensure reliable communication with the central station, various line test procedures are needed.

Conventionally, each Subscriber Line Interface Circuit (SLIC) has had both a test-out and a test-in relay associated with it in order that a test circuit could be switched on-line when tests are to be performed on the cable or the SLIC. To provide multiple relays includes a significant cost element in the provision of the test facilities. The present invention is directed to providing an improved apparatus and method for telephone line testing.

SUMMARY OF THE INVENTION

In accordance with the invention, therefore, there is provided a subscriber station for the wireless connection of user telecommunications equipment to a remote central station of a wireless telecommunications system, the subscriber station comprising a transmitter/receiver for wireless communication with a central station and a communications controller for processing signals for transmission and/or received signals, at least one telephone line for connection to subscriber telecommunications equipment, and a high impedance test circuit connected across a telephone line under test.

The use of a high impedance test circuit means that the test circuit can effectively be connected permanently across a telephone line under test. Where a single telephone line is provided or is to be tested, the cost of relays can be avoided altogether.

Alternatively, where the subscriber terminal comprises two or more telephone lines a relay can be provided for selectively connecting the test circuit across a telephone line under test. However, even in this case, the test circuit is continually connected across the telephone line under test.

By effectively connecting the high impedance test circuit permanently across the telephone line under test, that is connecting the test circuit across the telephone line during all operational conditions of the telephone line, the test circuit is able to provide a range of test functions, including self-test functions in a cost effective manner, which would not be possible with the conventional test circuits which are only switched in during line testing. Examples of such tests are:

overvoltage alarm when a telephone call is in progress;
undervoltage alarm when a telephone call is in progress (which can indicate faults in the subscriber's telephone);
ring generator voltage fail alarm when an incoming telephone call occurs;
ring trip fail alarm when an incoming telephone call is answered; and
off-hook detector fail alarm when a telephone call is in progress.

Preferably, the test circuit comprises an operational amplifier connectable across a telephone line for buffering the potential across the telephone line and a peak voltage detecting circuit connected to the output of the operational amplifier.

Preferably, the test circuit comprises a positive peak voltage detector and a negative peak voltage detector for detecting hazardous voltages. This allows testing for alternating current (A/C) voltages. It can also be used for detecting a ringing voltage altitude.

Preferably, the test circuit includes a circuit for detecting an externally applied voltage.

Preferably, the test circuit includes a circuit for detecting a voltage below a predetermined threshold in an off-hook condition of the telecommunications equipment as indicative of a short circuit condition.

Preferably, the test circuit includes a circuit for applying a voltage, via a resistor, separately to each wire of the telephone line under test, thus providing a potential divider to earth, and a voltage monitor circuit to measure the resulting line voltage. Such a circuit can be used to test for earth leakage.

Preferably, the test circuit comprises a circuit for determining the state of the user equipment on a telephone line by monitoring the discharge of a bell capacitor.

Preferably, the peak voltage detector is arranged to monitor a ringing amplitude for an incoming call and to compare the actual voltage against a minimum threshold.

Preferably, the test circuit comprises a circuit for monitoring cable voltage during idle and is responsive to a voltage below the off-hook voltage to indicate an off-hook detector fault.

Preferably, the test circuit comprises a looping circuit for making a dummy call and a dial tone detector indicating of a dial tone returned from central station as indicative of correct operation.

Preferably, the test circuit comprises a ring trip test circuit for testing the operation of a ring trip detector.

The invention also provides the use of a high impendence test circuit for connection to a telephone line of a subscriber terminal as defined above.

The invention also provides a wireless telecommunications system comprising at least one subscriber station as defined above.

In accordance with a second aspect of the invention, there is provided a method of testing functions of a subscriber station for the wireless connection of user telecommunications equipment to a remote central station of a wireless telecommunications system, the subscriber station comprising a transmitter/receiver for wireless communication with a central station and a communications controller for processing signals for transmission and/or received signals, at least one telephone line for connection to subscriber telecommunications equipment, the method comprising the step of providing a high impedance test circuit connected across a telephone line under test.

BRIEF DESCRIPTION OF THE DRAWINGS

An embodiment of the invention will be described hereinafter, by way of example only, with reference to the accompanying drawings in which like reference signs are used for like features and in which:

FIG. 1 is a schematic overview of an example of a wireless telecommunications system;

FIG. 2 is a schematic representation of a customer premises;

FIGS. 2A and 2B are schematic illustrations of an example of a subscriber terminal of the telecommunications system of FIG. 1;

DETAILED DESCRIPTION OF THE INVENTION

Figures 3, 3A:
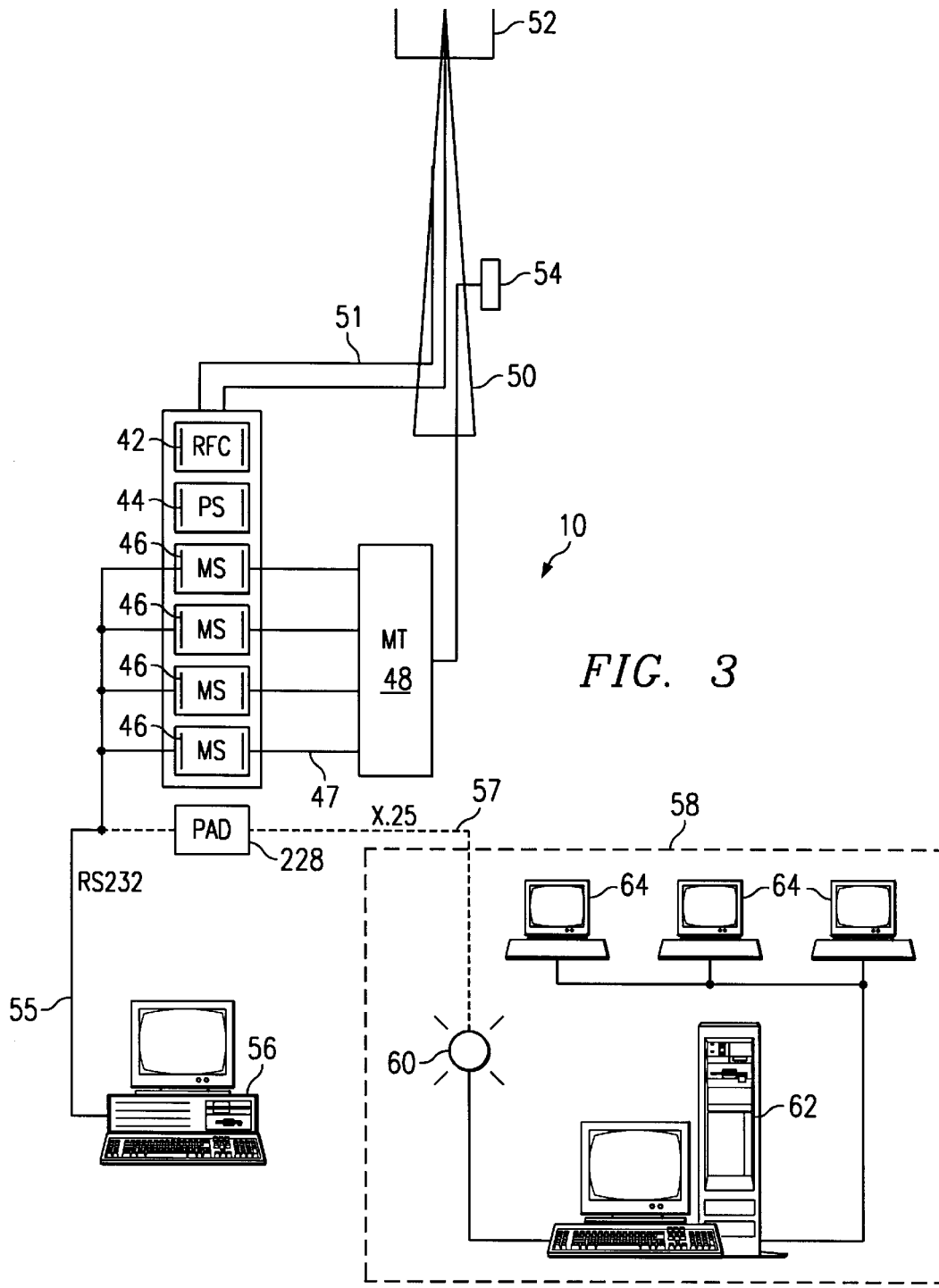
FIG. 3 is a schematic illustration of an example of a central terminal of the telecommunications system of FIG. 1.
FIG. 3A is a schematic illustration of a modem shelf of a central terminal of the telecommunications system of FIG. 1.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

FIGS. 2A and 2B illustrate an example of a configuration for a subscriber terminal 20 for the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and ×16 spreading with CDMA codes on the transmit signals, and synchronisation recovery, despreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems).

Figure 4:
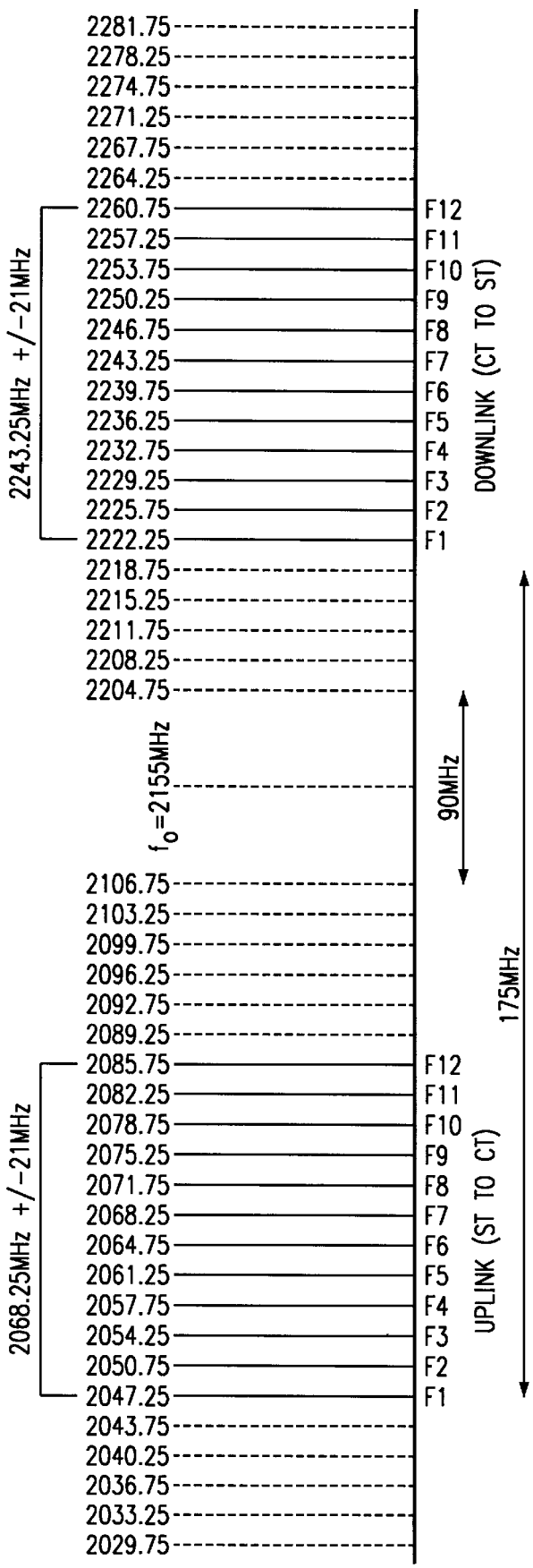
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

Figure 5A:
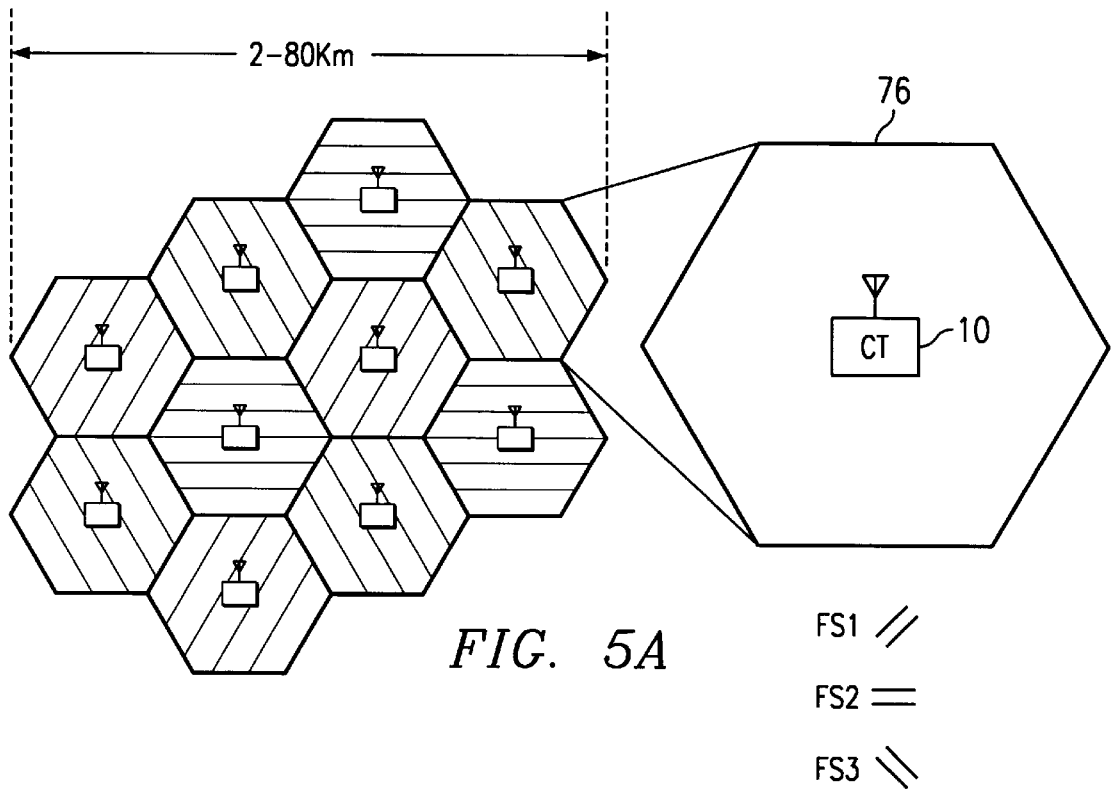
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
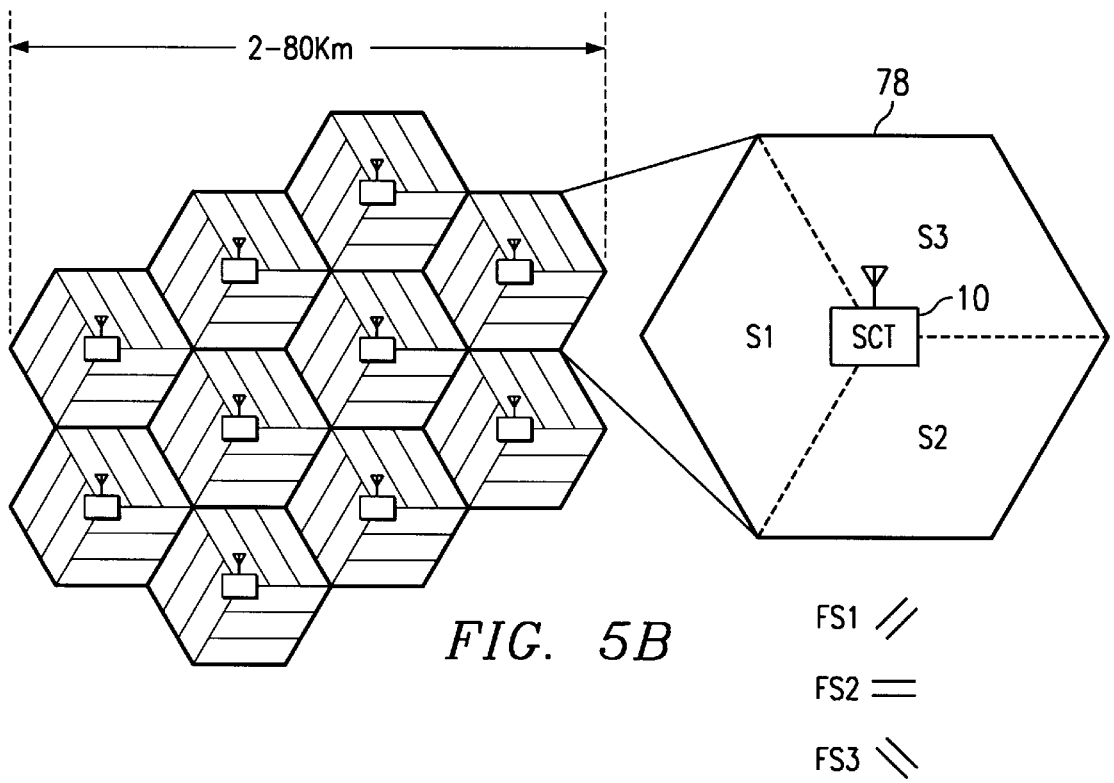

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

Figure 6:
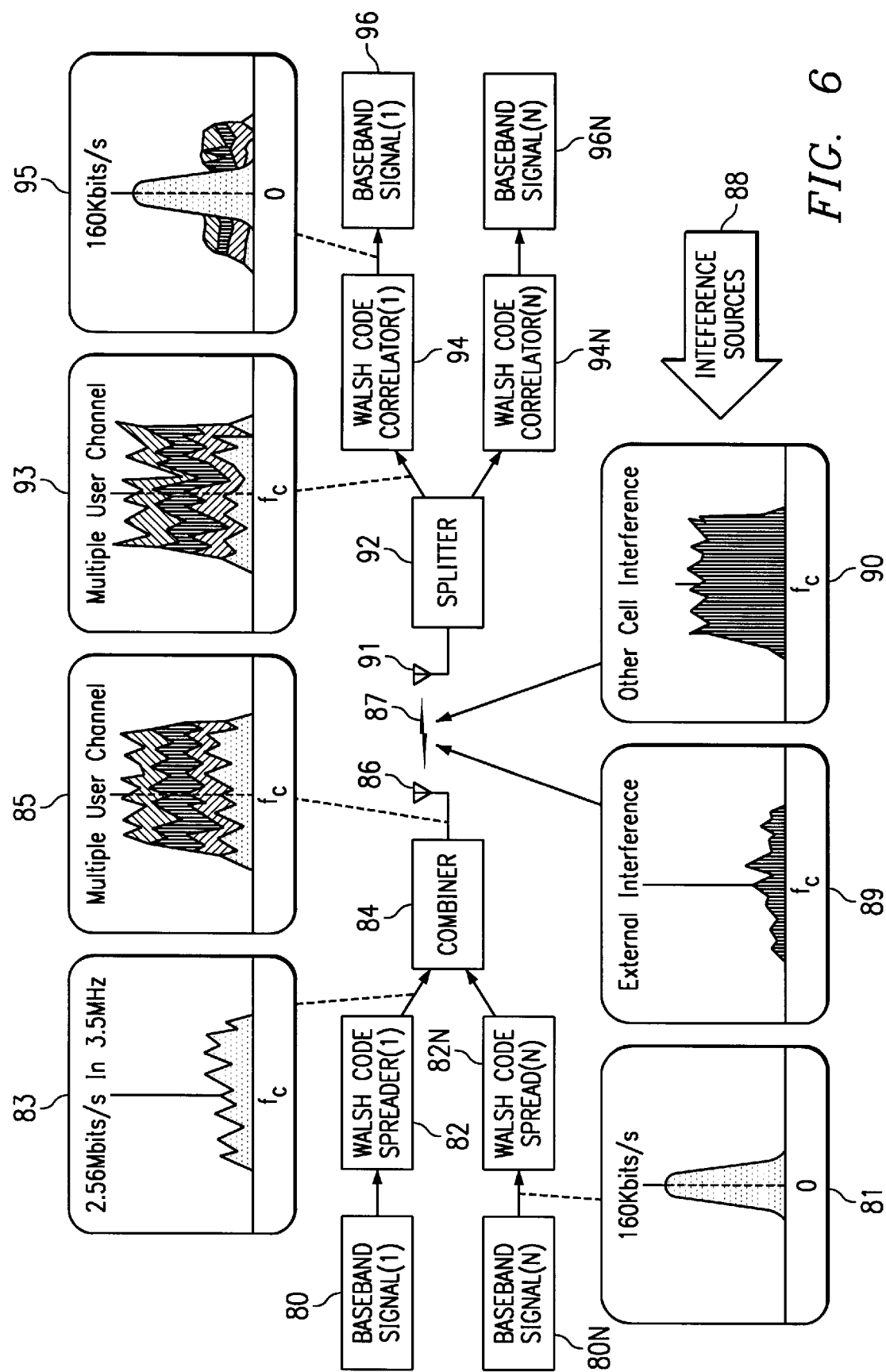
FIG. 6 is a schematic diagram illustrating aspects of a code division multiplex system for the telecommunications system of FIG. 1.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80–80N into a 160 ksymbols/sec baseband signal where each symbol represents 2 data bits (see, for example the signal represented at 81). This signal is then spread by a factor of 16 using a respective Walsh pseudo random noise (PN) code spreading function 82–82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94–94N uses the same pseudo random noise (PN) code that was used for the encoding for each subscriber link to extract a signal (e.g, as represented at 95) for the respective received baseband signal 96–96N. It will be noted that the received signal will include some residual noise. However, unwanted noise can be removed using a low pass filter and signal processing.

The key to CDMA is the application of orthogonal codes that allow the multiple user signals to be transmitted and received on the same frequency at the same time. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

Figure 7:
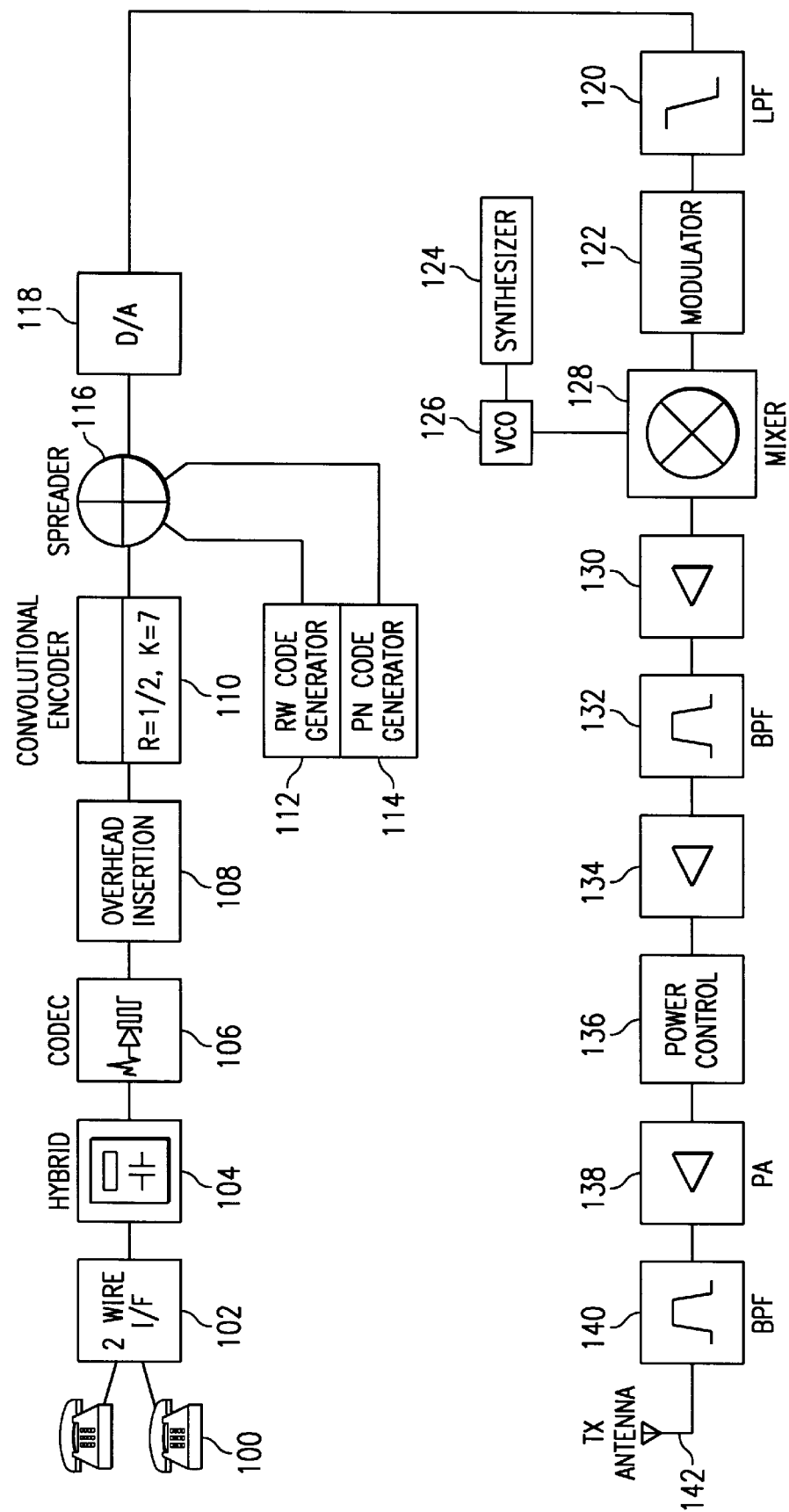
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Rademacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
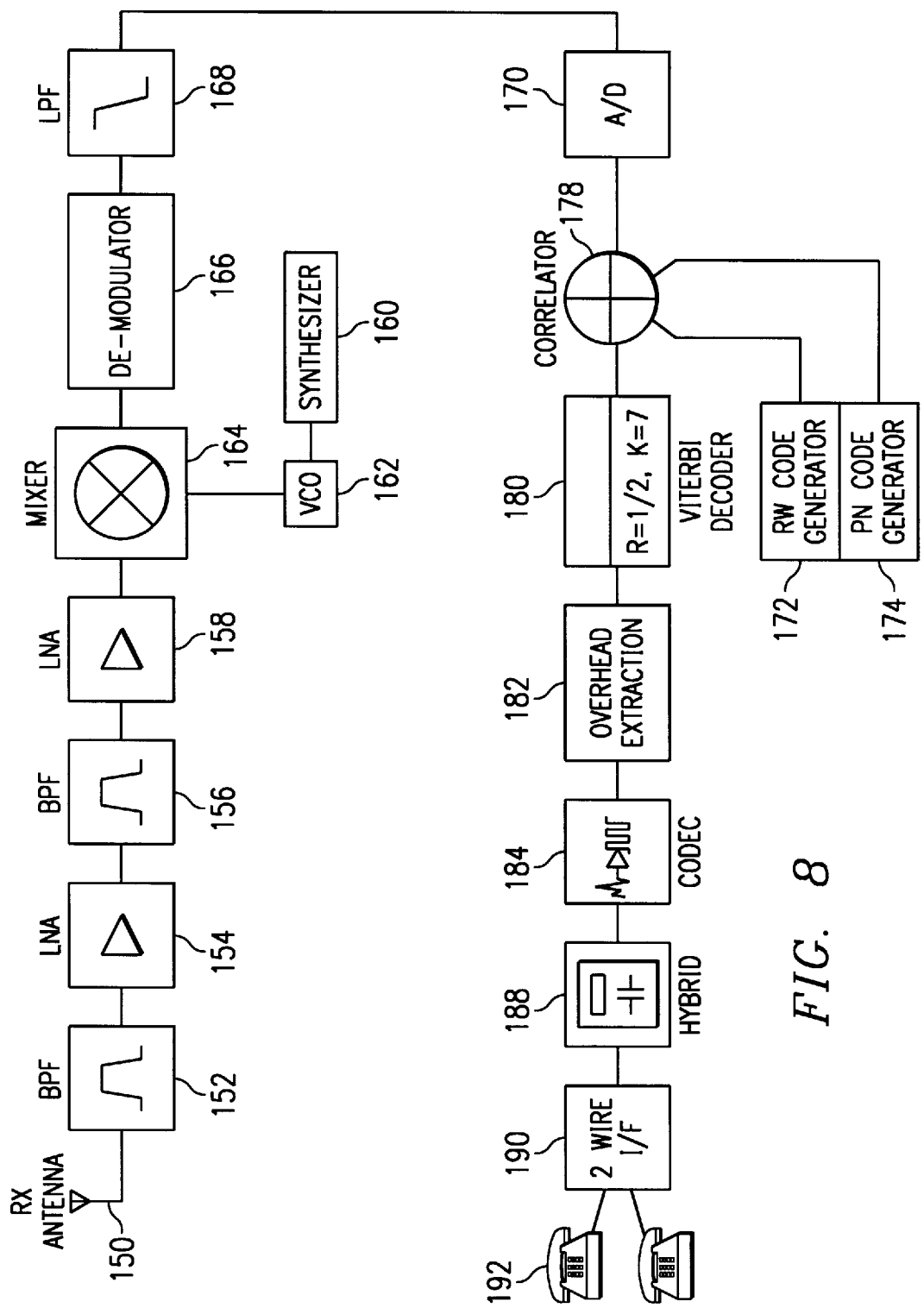
FIG. 8 is a schematic diagram illustrating signal reception processing stages for the telecommunications system of FIG. 1.

FIG. 8 is a schematic diagram illustrating the equivalent signal reception processing stages as configured in a subscriber reception terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

At the subscriber terminal 20, a stage of automatic gain control is incorporated at the IF stage. The control signal is derived from the digital portion of the CDMA receiver using the output of a signal quality estimator to be described later.

Figure 9:
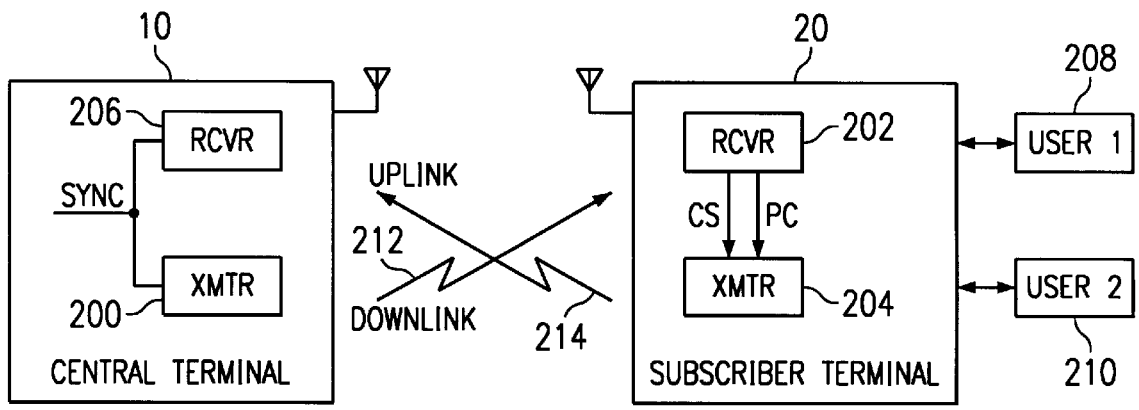
FIG. 9 is a schematic diagram illustrating downlink and uplink communication paths for the wireless telecommunications system.

FIG. 9 is a block diagram of downlink and uplink communication paths between the central terminal 10 and the subscriber terminal 20. A downlink communication path is established from the transmitter 200 in the central terminal 10 to the receiver 202 in the subscriber terminal 20. An uplink communication path is established from the transmitter 204 in the subscriber terminal 20 to the receiver 206 in the central terminal 10. Once the downlink and the uplink communication paths have been established in the wireless telecommunication system 1, telephone communication may occur between a first user 208 or a second user 210 of the subscriber terminal 20 and a user serviced through the central terminal 10 over a downlink signal 212 and an uplink signal 214. The downlink signal 212 is transmitted by the transmitter 200 of the central terminal 10 and received by the receiver 202 of the subscriber terminal 20. The uplink signal 214 is transmitted by the transmitter 204 of the subscriber terminal 20 and received by the receiver 206 of the central terminal 10. The downlink signal 212 and uplink signal 214 are transmitted as CDMA spread spectrum signals.

Figure 10:
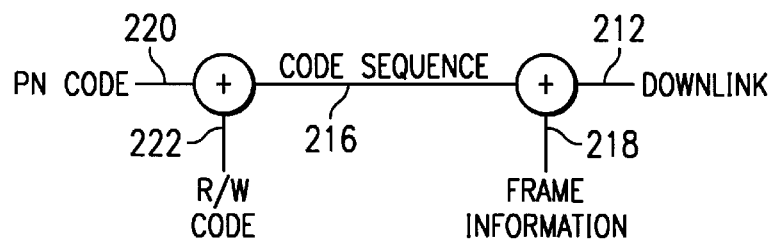
FIG. 10 is a schematic diagram illustrating a downlink signal transmitted by the central terminal.

The receiver 206 and the transmitter 200 within the central terminal 10 are synchronized to each other with respect to time and phase, and aligned as to information boundaries. In order to establish the downlink communication path, the receiver 202 in the subscriber terminal 20 should be synchronized to the transmitter 200 in the central terminal 10. Synchronization occurs by performing an acquisition mode function and a tracking mode function on the downlink signal 212. Initially, the transmitter 200 of the central terminal 10 transmits the downlink signal 212. FIG. 10 shows the contents of the downlink signal 212. The downlink signal 212 includes a code sequence signal 216 for the central terminal 10 combined with a frame information signal 218. The code sequence signal 216 is derived from a combination of a pseudo-random noise code signal 220 and a Rademacher-Walsh code signal 222. Although FIG. 10 relates specifically to the makeup of the downlink signal, the uplink has the same makeup.

Each receiver 202 of every subscriber terminal 20 serviced by a single central terminal 10 operates off of the same pseudo-random noise code signal as the central terminal 10. Each modem shelf 46 in the central terminal 10 supports one radio frequency channel and fifteen subscriber terminals 20, each subscriber terminal having a first user 208 and a second user 210. Each modem shelf 46 selects one of sixteen Rademacher-Walsh code signals 222, each Rademacher-Walsh code signal 222 corresponding to a unique subscriber terminal 20. Thus, a specific subscriber terminal 20 will have an identical code sequence signal 218 as the downlink signal 212 transmitted by the central terminal 10 and destined for the specific subscriber terminal 20.

The downlink signal 212 is received at the receiver 202 of the subscriber terminal 20. The receiver 202 compares its phase and code sequence to a phase and code sequence within the code sequence signal 216 of the downlink signal 212. The central terminal 10 is considered to have a master code sequence and subscriber terminal 20 is considered to have a slave code sequence. The receiver 202 incrementally adjusts the phase of its slave code sequence to recognize a match to master code sequence and place the receiver 202 of the subscriber terminal 20 in phase with the transmitter 200 of the central terminal 10. The slave code sequence of the receiver 202 is not initially synchronized to the master code sequence of the transmitter 200 and the central terminal 10 due to the path delay between the central terminal 10 and the subscriber terminal 20. This path delay is caused by the geographical separation between the subscriber terminal 20 and the central terminal 10 and other environmental and technical factors affecting wireless transmission.

When the downlink and the uplink communication paths are acquired, the wireless telecommunication system 1 enters the standby mode. In the standby mode, the transmitting power of the downlink and uplink transmitters are reduced by 12 decibels. This reduction in transmitting power minimizes the interference to other subscriber terminals while still maintaining synchronization. The transmit rate remains at the low rate level to allow exchange of control information between the central terminal 10 and the subscriber terminal 20 over the overhead channel 224.

When either an incoming or outgoing call is detected, a message is sent from the originating terminal to the destination terminal indicating that the downlink and uplink communication paths are required for the transmission of user traffic information. At this point, the wireless telecommunication system 1 enters into the traffic mode. During the traffic mode, the transmitting power of both the downlink and uplink communication paths is increased to the high power level and the transmit rate is increased to the high rate level of 160 kilobits per second to facilitate information transfer between originating and destination terminals. Upon detection of call termination, a message is sent from the terminating terminal to the other terminal indicating that the downlink and uplink communication paths are no longer required. At this point, wireless telecommunication system 1 reenters the standby mode. Code synchronisation and frame alignment tracking is performed in both the standby mode and the traffic mode.

Figure 11:
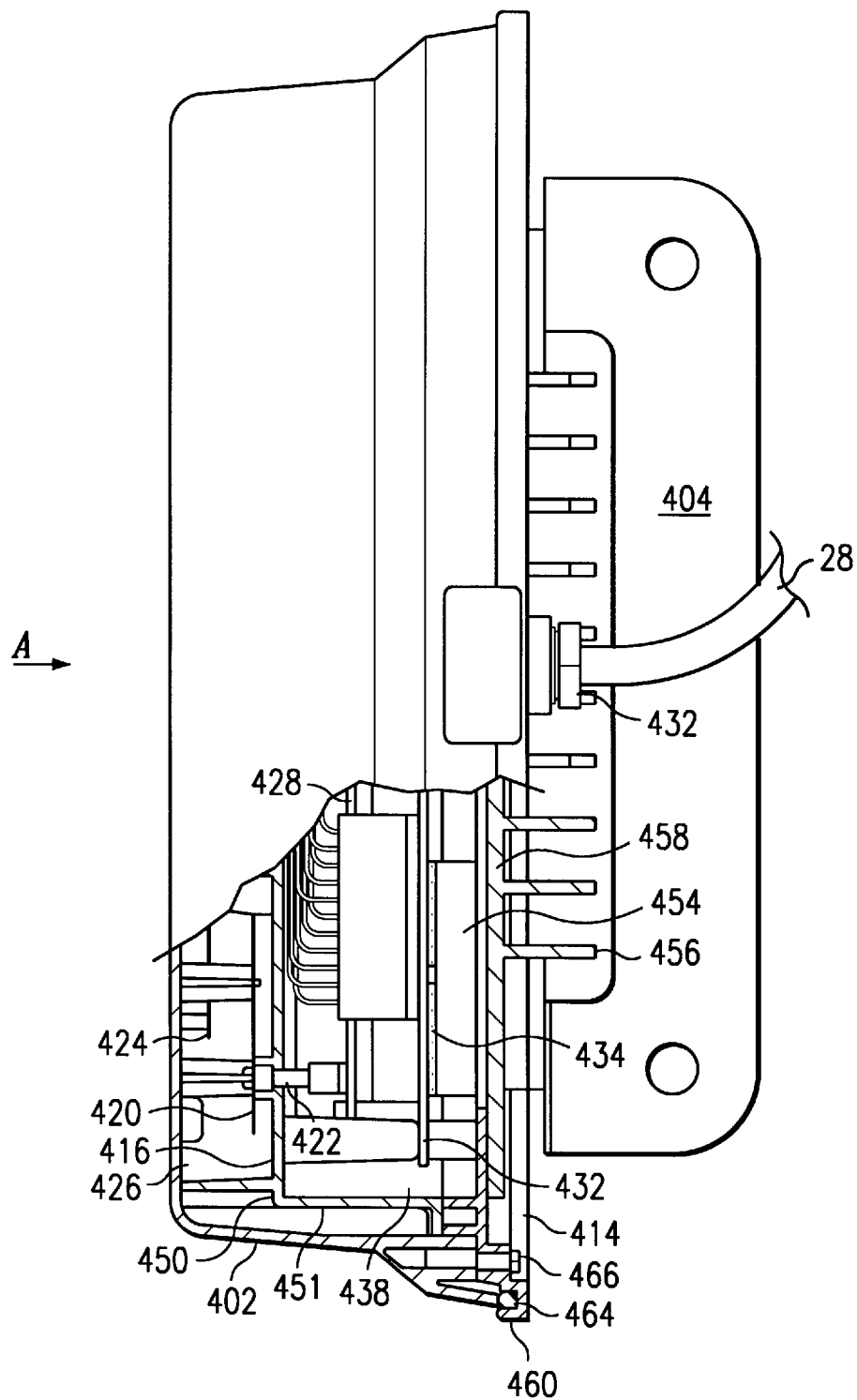
FIG. 11 is a schematic diagram, partially in cross-section of part of a subscriber terminal.

FIG. 11 is a schematic top view, partially in section of an example of an integrated antenna forming the customer radio unit (CRU) of FIG. 1.

FIG. 11 illustrates a chassis member 450 located within a radome 402. A vertically extending wall 416 of the chassis defines a rear wall for first and second resonant cavities 426 defined to the front of the wall 416. Part of one resonant cavity 426, which is located in the right hand portion of the antenna (the lower portion of FIG. 11) when viewed from the front (arrow A) is shown in FIG. 11. The other resonant cavity (not shown) is located in the left hand portion of the antenna (the upper portion of FIG. 11) when viewed from the front (arrow A). A wall (not shown) extends vertically (perpendicularly to the plane of FIG. 11) and forwardly (i.e. to the left in FIG. 11) from the wall 416 to separate the first and second dished resonant cavities 416.

The chassis member is preferably made of the same plastics material as the radome, although other plastics or other materials could be used. The forwardly facing surface of the vertically extending wall 416, the inwardly facing surfaces of the peripheral wall 419 and both sides of the horizontally extending wall 417 are preferably metallised, for example with a deposited layer of aluminium or an aluminium alloy for reflecting radio waves to define the resonant cavities.

Part of the radome 402 is cut away in the lower part of the Figure to show part of a microstrip radiator element 420 and patch re-radiator (reflector) 424. A stud 422 extends from the microstrip 420 and through the wall 416 to couple radio energy though the wall 416.

The chassis member 450 also has a rearwardly extending peripheral wall 451 for defining a rear cavity 438 for containing electronic components on one or more printed circuit boards. In FIG. 11, an RF board 428 having radio frequency circuitry 430 is provided which, when inserted in cavity 438, cooperates with the stud 422 on the microstrip 420. Also shown is a modem board 432 having modem circuitry for processing received signals from and for providing transmission signals to the RF circuitry 430. The modem circuitry 434 is then connected via a drop cable 28 which passes through a gland 435 in the rear cover 414 to the power supply unit 30 shown in FIG. 2.

The rear side of the wall 416 and the insides of the peripheral wall 451, as well as the inside of the rear cover 414, can be metallised to provide electromagnetic shielding for the electronic components in the rear cavity 438.

In this embodiment, the rear cover 414 has a peripheral portion 460 of plastics material and a central portion 458 formed of aluminium alloy with integral fins 456 to form an integral heat sink. The provision of a heat sink enables heat to be dissipated from electronic components sealed within the integrated antenna units. A bracket 404 is secured to the heatsink by screws 464 (see FIG. 14) although it could be formed integrally with the aluminium portion 458 of the rear cover. An 'O'-ring seal 464 seals the rear cover 460 to the radome when the cover is secured thereto by screws 466. The aluminium portion 458 can be screwed at locations 466 to the peripheral plastics portion and sealed using conventional silicon sealant materials. The inside of the plastics portion 460 of the cover preferably has an aluminium coating to reduce electromagnetic interference.

In an alternative embodiment, the whole of the rear cover could be made of metal, for example, a cast aluminium alloy including the heat sink fins 456 and possibly the bracket 404.

To increase the heat transfer from the electronic components to the heatsink, the heatsink can be provided with internal pedestals 454 for contacting the circuits, or the circuit boards, directly. Alternatively, or in addition, heat conductive foam 452 can be used to couple the heat from the electronic components to the heat sink. This is particularly advantageous where a lot of heat is generated from the electronic components or when the antenna is used in warm environments, in order to avoid overheating of the components within the sealed unit.

Figure 12:
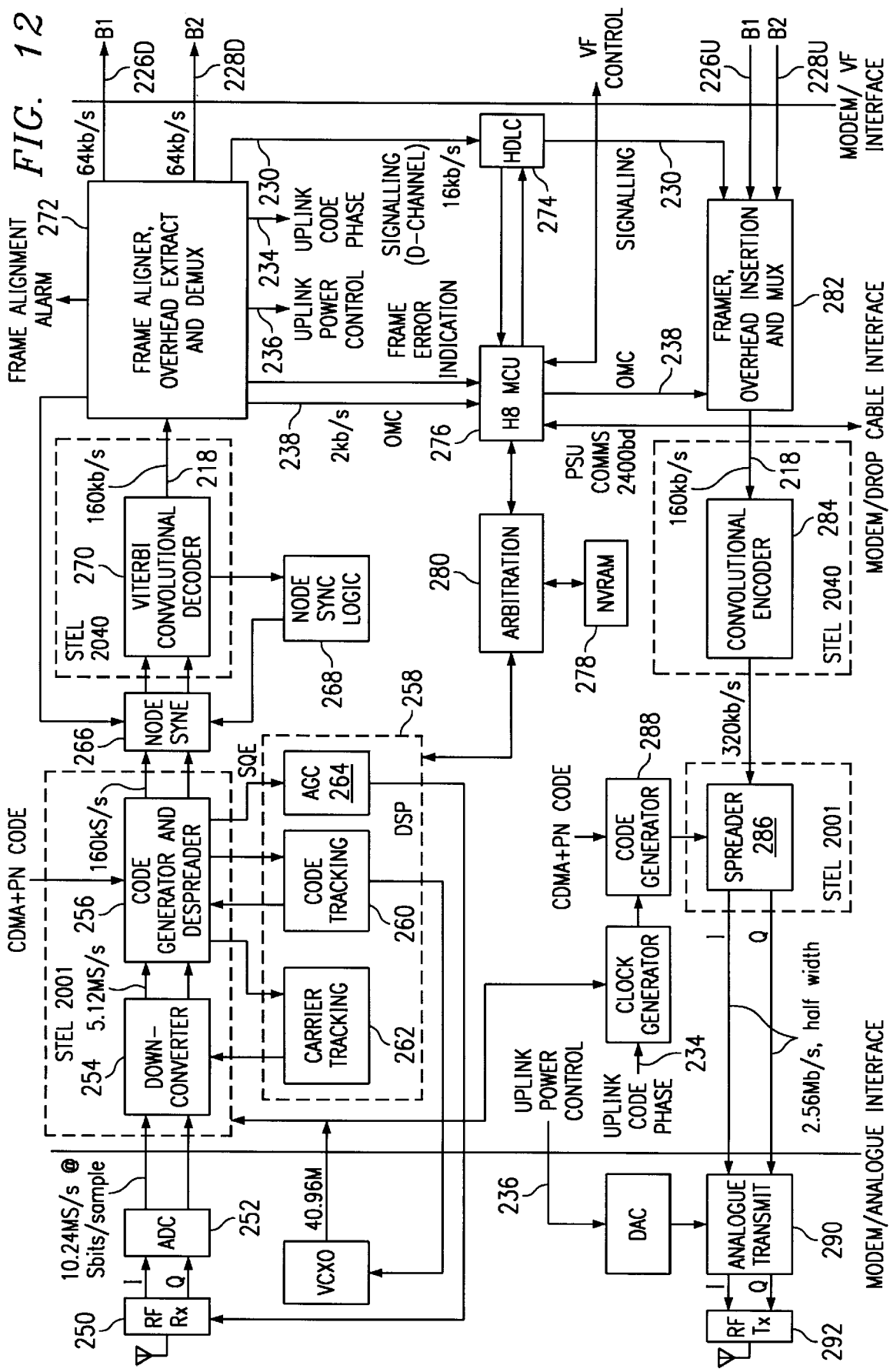
FIG. 12 is a schematic diagram of a communications controller of a subscriber terminal.

FIG. 12 is a detailed block diagram of a communications controller including the receiver 202 and transmitter 204 in a subscriber terminal 20. The receiver 202 receives the downlink signal 212 at an RF receive interface 250. The RF receive interface 250 separates the spread spectrum signal into I and Q signal components. The RF receive interface 250 band pass filters each of the I and Q signal components by removing portions above approximately half of the receiver 202 bandwidth of 3.5 MegaHertz. The RF receive interface 250 low pass filters the I and Q signal components to reject image frequencies and prevent signal aliasing. The I and Q signal components are placed into digital format by an analog to digital converter 252. The sampling frequency of the analog to digital converter 252 is four times the chip period, or 10.24 MegaHertz, with an eight bit resolution.

Within the communications controller, the digital I and Q signal components are stepped to a rate of 5.12 MegaHertz by a down converter 254. A code generator and despreader 256 performs synchronization acquisition and tracking functions to synchronize the phase of the Rademacher-Walsh and pseudo-random noise code sequence of the receiver 202 to that of the downlink signal 212. A digital signal processor 258 controls the phase of the slave code sequence through a code tracker 260 and a carrier tracker 262. An automatic gain control unit 264 produces an automatic gain control signal to control the gain of RF receive interface 250. The code generator and despreader 256 generates the I and Q 160 kilobits per second of frame information for further synchronization by a node sync interface 266 under the control of a node sync logic unit 268. The node sync interface 266, through the node sync logic unit 268, determines whether the I and Q channels should be swapped, as they may be received in four different ways.

The Viterbi decoder 270 provides forward error correction on the I and Q channels and generates an error corrected 160 kilobits per second data signal after a 71 symbol delay. The error corrected signal is processed by a frame aligner and the extractor 272 determines frame alignment and extracts a power control signal 236, code synchronization 234, and an operations and maintenance channel signal 238. The frame aligner and extractor 272 also extracts a first user channel 226 and a second user channel 228 for traffic transmission towards a first user 208 and a second user 210, and a signalling channel 230 for processing by high level data link controller 274 and a microcontroller 276. The frame aligner and extractor 272 also provides alarm and error indications upon detecting a loss in frame alignment. A non-volatile random access memory 278 stores system parameter information for subsequent insertion through an arbitrator 280 in the event of link loss in order to facilitate link reestablishment. The arbitrator 280 also provides an interface between the digital signal processor 258 and the microcontroller 276.

In the transmit direction, a frame inserter 282 receives first user traffic and second user traffic from the first user 208 and the second user 210, signalling channel 230 information from the high level data link controller 274, and operations and maintenance channel 238 information from the microcontroller 276. Frame inserter generates the frame information signal 218 for uplink signal 214 for processing by a convolutional encoder 284. The convolutional encoder 284 doubles the data rate of the frame information signal 218 to provide forward error correction. A spreader 286 splits the 320 kilobits per second signal of the convolutional encoder 284 into two 160 kilobits per second I and Q signals and exclusively ORs these signals with the spreading sequence generated by a code generator 288 in response to a system clock generated by the clock generator 290 as adjusted by the code synchronization signal 234. The code generator 288 generates one of sixteen Rademacher-Walsh functions exclusive ORed with a pseudo-random sequence having a pattern length of 256 with a chip rate of 2.56 MegaHertz. The pseudo-random sequence should match that of central terminal 10, but is adjustable under software control to provide reliable rejection of signals from other bands or other cells.

The spreader 286 of the communications controller supplies the I and Q signals to an analog transmitter 290. The analog transmitter 290 produces pulsed I and Q signals for an RF transmit interface 292. Transmit power is generated by first establishing a control voltage from a digital to analog converter in response to the power control signal 236 extracted from the overhead channel 224. This control voltage is applied to the power control inputs of analog transmitter 290 and RF transmit interface 292. Power control of 35 decibels is obtainable in both the analog transmitter 290 and the RF transmit interface 292. The RF transmit interface 292 includes a step attenuator that provides 2 decibel steps of attenuation over a 30 decibel range. This attenuator is used to switch between high and low power levels. On power up, maximum attenuation is selected to minimize the transmitting power of transmitter 204.

Figure 13:
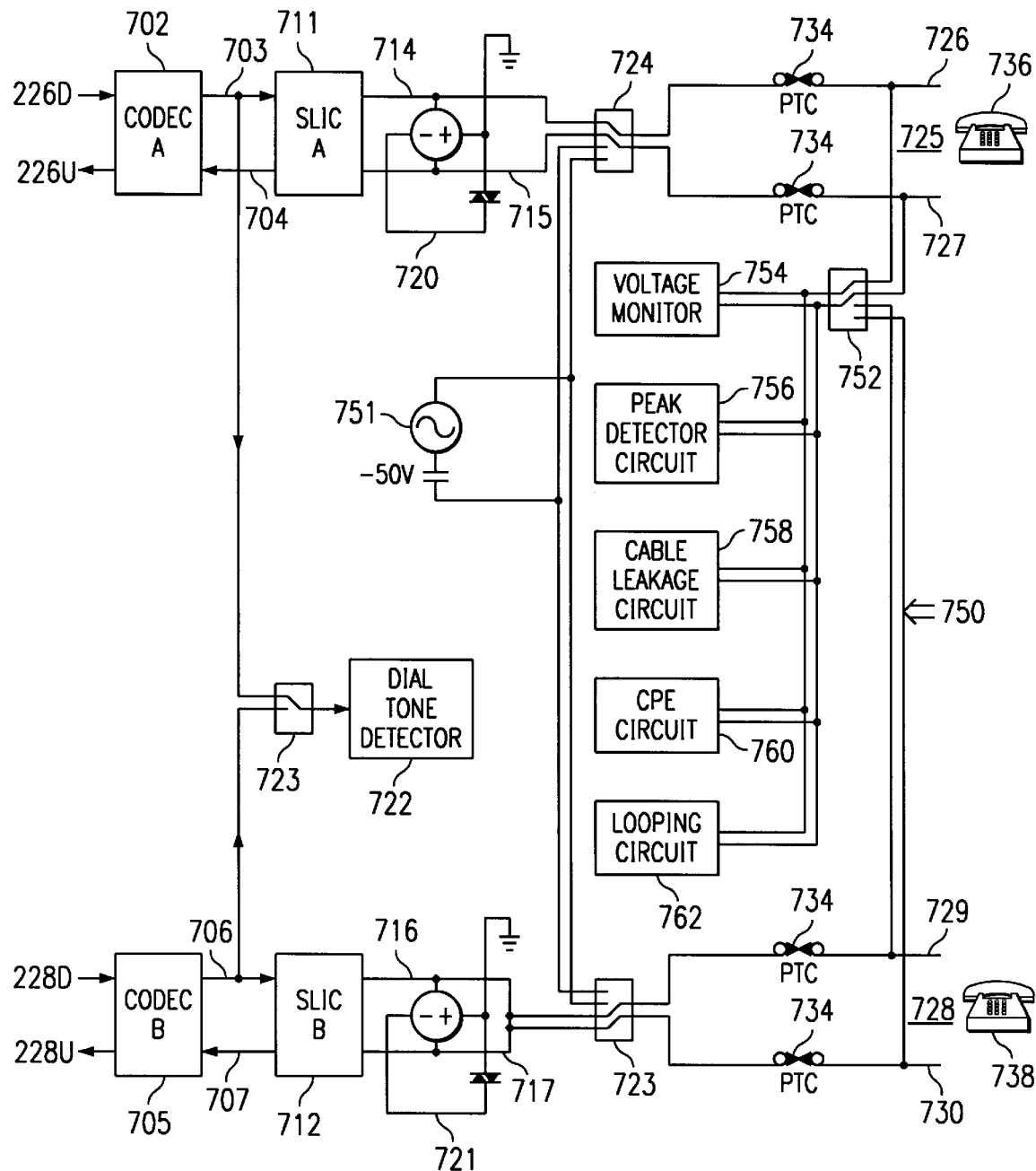
FIG. 13 is a schematic block diagram giving an overview of test circuits of an embodiment of the invention.

FIG. 13 is a schematic block diagram of a high impedance test circuit as connected across the telephone lines of a subscriber terminal as described above.

A first COder/DECoder (CODEC) 702, which forms part of the VF interface of the first user channel 226 (B1) of FIG.

12 for connecting the modem elements of the communications controller shown in FIG. 13 to the first telephone line at the subscriber terminal. The first CODEC 702 is connected via incoming 703 and outgoing 704 lines to a first Subscriber Line Interface Circuit (SLIC) 711, which also forms part of the VF interface. This is in turn is connected via first and second wires 714 and 715 and a relay 724 to the first and second wires 726 and 727 of a first telephone line 725 to which a first subscriber telephone 736 can be connected.

A second CODEC 705, which forms part of the VF interface of the second user channel 228 (B2) of FIG. 12 for connecting the modem elements of the communications controller shown in FIG. 13 to the second telephone line at the subscriber terminal. The second CODEC 705 is connected via incoming 706 and outgoing 707 lines to a second SLIC 712, which also forms part of the VF interface. This is in turn is connected via first and second wires 716 and 717 and a relay 726 to the first and second wires 729 and 730 of a second telephone line 728 to which a second subscriber telephone 738 can be connected.

A first transient clamp 720 is connected wires 714 and 715 and to earth. A second transient clamp 721 is connected wires 716 and 717 and to earth. Positive temperature coefficient surge protectors (PTCs) 734 are connected in each of the wires 726, 727, 729 and 730. The purpose of the transient clamps and the surge protectors is to protect the main circuitry of the subscriber terminal from surge voltages.

A dial tone detector 722, which can be of conventional design, is selectively connectable by means of a relay 723 to the incoming lines of 703 and 706 from the CODECs 702 and 705 in order to detect an exchange generated dial tone.

A ring generator 751, which can be of conventional design, is selectively connectable by means of the relays 724 and 726 to the telephone lines 725 and 728, respectively, for generating ringing tones on detection of an incoming telephone call.

The test circuits 750 are selectively connectable across the wires of the telephone lines 725 and 728 by means of the relay 752. When the test circuits have been connected to a telephone line 725 or 728 to put that line under test, it is effectively left in permanent or continuous connection, until it is desired to test the other telephone line 728 or 725.

The test circuits are configured as high impendence circuits so that they may be left in permanent connection during testing. To this end, SLICs having a high impedance mode, such as Ericsson PLB3798 SLICs, are used in the preferred embodiment of the invention for the SLICs 711 and 712. The purpose of each SLIC 711 and 712 is to provide power and speech to the telephone line connected thereto.

Figure 14:
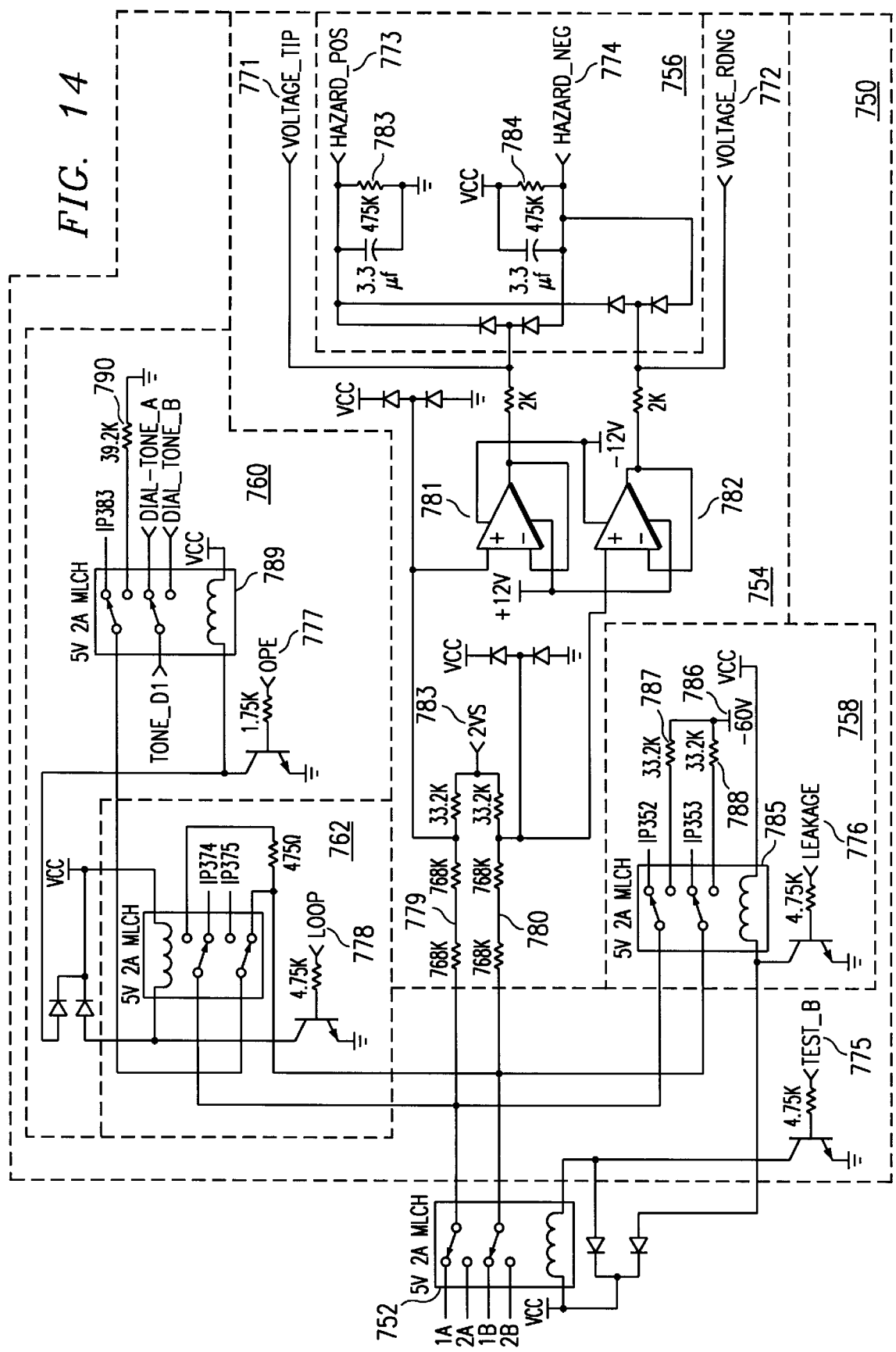
FIG. 14 illustrates in more detail examples of the test circuits of FIG. 13.
Figure 15:
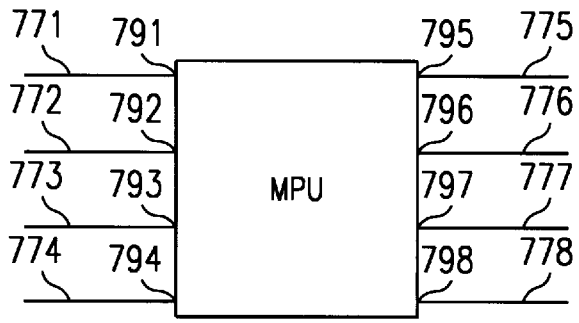
FIG. 15 illustrates the connection of the outputs from the test circuits of FIG. 14 to a microcontroller.

The test circuitry includes a voltage monitor, 754, a peak voltage detector 756, a cable leakage circuit 758, a customer premises equipment test circuit 760 and a looping circuit 762. One implementation of these circuits is illustrated in more detail in FIGS. 14 and 15. FIG. 14 illustrates the test circuits in more detail. It also illustrates values for certain of the components of the test circuits. FIG. 15 illustrates the connection of a microcontroller 790 to various inputs and outputs of the test circuits of FIG. 14. First to fourth analogue to digital converter inputs 791 to 794 of the microcontroller 790 are connected to respective ones of the outputs 771 and 772 of the peak detector circuit 758 and the outputs 773 and 774 of the voltage monitor circuit 754. First to fourth outputs 795–798 of the microcontroller 790 are connected to respective inputs 775–778 to the test circuits 750, to be described later. Other inputs and outputs to the microcontroller (not shown) can be provided. Also, rather than having a plurality of inputs and outputs to the test circuits, the microcontroller could have a lower number of inputs and outputs and be connected to the test circuits via one or more multiplexers.

In FIG. 14, it can be seen that relay 752 permits the test circuits 750 to be connected in a continuous, or permanent manner, to either of the first and second telephone lines, the connection to those lines being permanent until the connection is switched to the other of those lines. It will be noted that the test circuits are permanently connected one of the first or the second telephone lines by means of the relay 752.

The voltage monitor circuit 754 comprises first and second operational amplifiers 781 and 782 connected via the voltage divider resistor chains 779 and 780 and the relay 752 to the first and second wires of the telephone line under test. The voltage divider chains 779 and 780 divide down the telephone line potential to between +5V and ground, with a reference of +2.5V 783. A chain of resistors is employed to give increased tolerance to high voltages and to reduce "creepage". In the preferred embodiment of the invention each resistor chain comprises a pair of resistors, each of 782 KOhms, giving a total resistance of about 1.5 MOhms and a third resistor of 33.2 KOhms. Preferably the combined resistance of the pair of resistors is at least 100 KOhm, preferably at least 500 KOhm and typically of the order of 1 MOhm or more. The voltage divider comprising the pair of 782 KOhm resistors and the further 33.2 KOhm resistor divide down the telephone line potential to between +5V and ground, with a reference of +2.5V 783 to enable the microntroller to measure the resulting voltages via its A/D inputs.

The resistors 779 and 780, in combination with the operational amplifiers provide a high impedance connection of the voltage monitor circuit 754 to the telephone line under test. The output of the operational amplifiers 781 and 782 are supplied to the first and second voltage outputs 771 and 772 of the voltage monitor circuit.

As the normal voltage of the SLIC circuit of the telephone line under test is known, any externally applied voltage which differs from that of the SLIC can be detected by the microcontroller at the inputs 791 and 792. The resolution of the voltage monitor can be chosen by setting the gain of the operational amplifiers 781 and 782 (not shown).

The outputs of the first and second operational amplifiers 781 and 782 of the voltage monitor circuit 754 also provide a current input to the peak voltage detector circuit 756. A first current input is supplied to a positive peak detector circuit 783 comprising a diode and capacitor and a second current input is supplied to a negative peak detector circuit 784, also comprising a diode and capacitor. Positive and negative peak voltage outputs 773 and 774 are provided from the positive and negative peak detector circuits 783 and 784, respectively. The microcontroller 790 reads and processes the outputs 773 and 774 from the peak detection circuits 783 and 784 via its inputs 793 and 794, respectively.

The microcontroller can provide a short circuit test using the outputs 771 and 772 from the voltage monitor circuit 754. An off-hook telephone in normal conditions will have in excess of 6V across it. Therefore any voltage less than this which is detected by the microcontroller at the outputs of the voltage monitor circuit 754 is considered a short circuit. This threshold can be adjusted when the telephone is in the parked state.

It can also indicate a fault in the subscriber's equipment. If a normal voltage of −48V is detected by the microcontroller at the outputs 771 and 772 of the voltage monitor circuit 754 during an on-hook state and then the voltage is below the threshold during the off-hook state, the microcontroller 790 can be arranged to indicate a problem with the customer's telephone.

The resistor chains 779 and 780 enable the voltage peak detector circuitry 756 to withstand 240V, 50 Hz mains voltage on the line under test. In this condition, the voltage peak detector circuitry will indicate a hazardous voltage at the outputs 773 and/or 774, which is detected by the microcontroller. This test is made under the control of the microcontroller 790 prior to earth leakage and/or master socket/apparatus detection tests, by providing a test signal to the "Test-B" input 775. If the result is positive, the microcontroller prevents any other testing, will not connect ringing to the telephone and thus prevents incoming calls. The main circuitry of the subscriber terminal, including the CODECs and SLICs is provided by means of the PTCs 734 and the transient clamps 720 and 721.

The telephone line leakage circuit 756 is arranged selectively to supply, via a relay 785, a potential of −60V 786 to an individual wire of the telephone line under test via respective resistors 787 and 788, thus providing a potential divider to earth through the cable leakage. This initiates this test, the microcontroller provides a signal to 776 in order to operate the relay 785. The voltage on the telephone line is then monitored by the microcontroller using the voltage monitor circuit 754.

The customer premises equipment test circuit 760 comprises a relay 789 controlled by a signal from the microcontroller at the input 777 and a resistor 790 (typically 39.2 KOhm). This test circuit is used to determine the state of the customer telephone equipment connected to the telephone line under test. Three states can be determined, namely: (1) phone and master socket present; (2) master socket only present; and (3) master socket missing. These must be detectable when there is up to 30 KOhms leakage. The test works by monitoring the discharge of a bell capacitor in the customer telephone equipment or the network termination unit.

Figure 16:
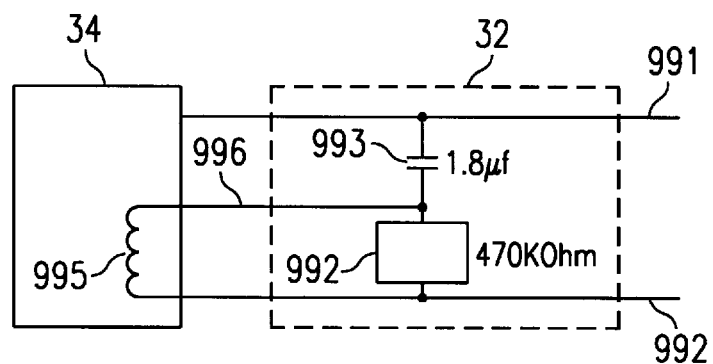
FIG. 16 illustrates a network termination unit.

FIG. 16 is a schematic representation of a network termination unit of a type typically used in the United Kingdom. Similar arrangements are used in other countries. As shown in FIG. 16, the network termination unit 32 includes a bell capacitor 993 (typically 1.8 µf) and a resistor 992 (typically 470 KOhm) across the wires 991 and 992 of the telephone line. The bell coil 995 in the customer's telephone 34 is connected across the wires 996 and 992 of the telephone line termination. The customer premises equipment test circuit 760 thus makes use of the bell capacitor 993 to test the customer premises equipment.

If there is an instantaneous discharge, then it is assumed that there is no network termination unit master socket 32. If there is a telephone bell, then discharge will happen quickly through the bell. If there is a master socket 32, but no phone, the discharge will drop quickly to a low voltage due to the potential divider effect of the 470 KOhm 992 (in the network termination master socket) to 39 KOhm 790 (in the customer premises equipment test circuit 760) ratio, and from then there will be a slow discharge. The rate is discharge is then monitored by the microcontroller using the voltage monitor circuit 754 to establish the state of the customer telephone apparatus.

This arrangement is advantageous because the voltage monitor circuit 754 can detect negative potentials, as a result of which the appropriate SLIC is itself used to charge up the bell capacitance, and is switched to high impedance mode to cause discharge. This avoids the need to use a positive voltage rail to charge up the bell capacitor and circuitry associated with this.

The test circuits also permit some self-test and system test features.

The microcontroller is arranged to use the peak voltage detector circuit outputs to monitor the ringing amplitude each time the telephone rings. To do this the microcontroller compares the actual voltage against a minimum threshold. The peak voltage should not be read until 250 mS of the ringing cadence, which allows the ring voltage to settle.

The microcontroller also uses the voltage monitor circuit to monitor the telephone line voltage during the IDLE state. If the voltage is below that required to indicate and off-hook state, then there is a fault with the off-hook detector.

The looping circuit 762 is used to make a dummy telephone call. The telephone exchange should respond with a "dial tone". If the dial tone detector 722 detects the dial tone, this confirms the ability of the subscriber terminal to make a telephone call.

A ring trip fail alarm test is performed when the ringing cadence is applied. When the telephone is answered, the peak voltage should fall in value. When this occurs and no ringing trip indication is present, then the inference is that the ring trip detector is malfunctioning.

Although a particular embodiment has been described herein, it will be appreciated that the invention is not limited thereto and that many modifications and additions thereto may be made within the scope of the invention.

For example, although specific tests have been described, other tests may also be provided within the scope of the invention. Also, although in the present embodiment a microcontroller has been used to control the operation of the test circuits, this could alternatively be performed by a microcomputer, or alternatively by special purpose hardware logic, for example a suitably configured ASIC.

What is claimed is:

1. A subscriber station for the wireless connection of user telephone set to a remote central station of a wireless telecommunications system, said subscriber station comprising:

a transmitter/receiver for wireless communication with the remote central station;

a communications controller coupled to the transmitted receiver for processing signals for transmission and/or received signals;

subscriber telephone set coupled to the communications controller by at least one telephone line; and a high impedance test circuit connected across said telephone line, said high impedance test circuit operable to provide testing of said subscriber telephone set and said telephone line.

2. A subscriber station according to claim 1, comprising two or more telephone lines and a relay for selectively connecting said test circuit across one of said telephone lines.

3. A subscriber station according to claim 1, wherein said test circuit is continually connected across said telephone line during normal operation of said subscriber telephone set.

4. A subscriber station according to claim 1, wherein said test circuit is connected to each wire of said telephone line via a resistive connection.

5. A subscriber station according to claim 4, wherein said resistive connection comprises a plurality of resistors.

6. A subscriber station according to claim 4, wherein said resistive connection has a resistance in excess of 100 KOhm, preferably in excess of 500 KOhm and more preferably in excess of 1 MOhm.

7. A subscriber station according to claim 1, wherein said test circuit comprises an operational amplifier connectable across said telephone line for buffering the potential across said telephone line and a voltage monitor circuit connected to the output of said operational amplifier.

8. A subscriber station according to claim 7, wherein said voltage monitor circuit comprises a peak voltage monitor circuit.

9. A subscriber station according to claim 8, wherein said peak voltage detector is arranged to monitor a ringing amplitude for an incoming call and to compare the actual voltage against a minimum threshold.

10. A subscriber station according to claim 1, wherein said test circuit comprises a positive peak voltage detector and a negative peak voltage detector for detecting hazardous voltages.

11. A subscriber station according to claim 1, wherein said test circuit includes a circuit for detecting an externally applied voltage.

12. A subscriber station according to claim 1, wherein said test circuit includes a circuit for detecting a voltage below a predetermined threshold in an off-hook condition of the telephone set as indicative of a short circuit condition.

13. A subscriber station according to claim 1, wherein said test circuit includes a circuit for applying a voltage, via a resistor, separately to each wire of said telephone line under test, thus providing a potential divider to earth, and a voltage monitor circuit to measure the resulting line voltage.

14. A subscriber station according to claim 1, further comprising a bell capacitor, wherein said test circuit includes a circuit for determining the state of the user equipment on a said telephone line by monitoring the discharge of said bell capacitor.

15. A subscriber station according to claim 1, wherein said test circuit includes a circuit for monitoring cable voltage during idle and is responsive to a voltage below the off-hook voltage to indicate an off-hook detector fault.

16. A subscriber station according to claim 1, wherein said test circuit includes a looping circuit for making a dummy call and a dial tone detector indicating of a dial tone returned from central station as indicative of correct operation.

17. A subscriber station according to claim 1, wherein said test circuit includes a ring trip test circuit for testing the operation of a ring trip detector.

18. A method of testing functions of a subscriber station for the wireless connection of user telephone set to a remote central station of a wireless telecommunications system, said subscriber station comprising a transmitter/receiver for wireless communication with a central station, a communications controller for processing signals for transmission and/or received signals and at least one telephone line for connection to subscriber telephone set, said method comprising the step of providing a high impedance test circuit connected across a said telephone line said high impedance test circuit operable to provide testing of said subscriber telephone set and said telephone line.

19. A method according to claim 18, wherein said subscriber station comprises two or more telephone lines, said method comprising selectively switching said test circuit across one of said telephone lines under test using a relay.

20. A method according to claim 18, comprising the step of maintaining said test circuit in continuous contact across said telephone line during normal operation of said subscriber telephone set.

* * * * *